Oct. 10, 1939.   C. C. KASKELL   2,175,898
COUPLING FOR CONTINUOUSLY CHANGING SPEED TRANSMISSIONS
Original Filed Jan. 17, 1936   2 Sheets-Sheet 1
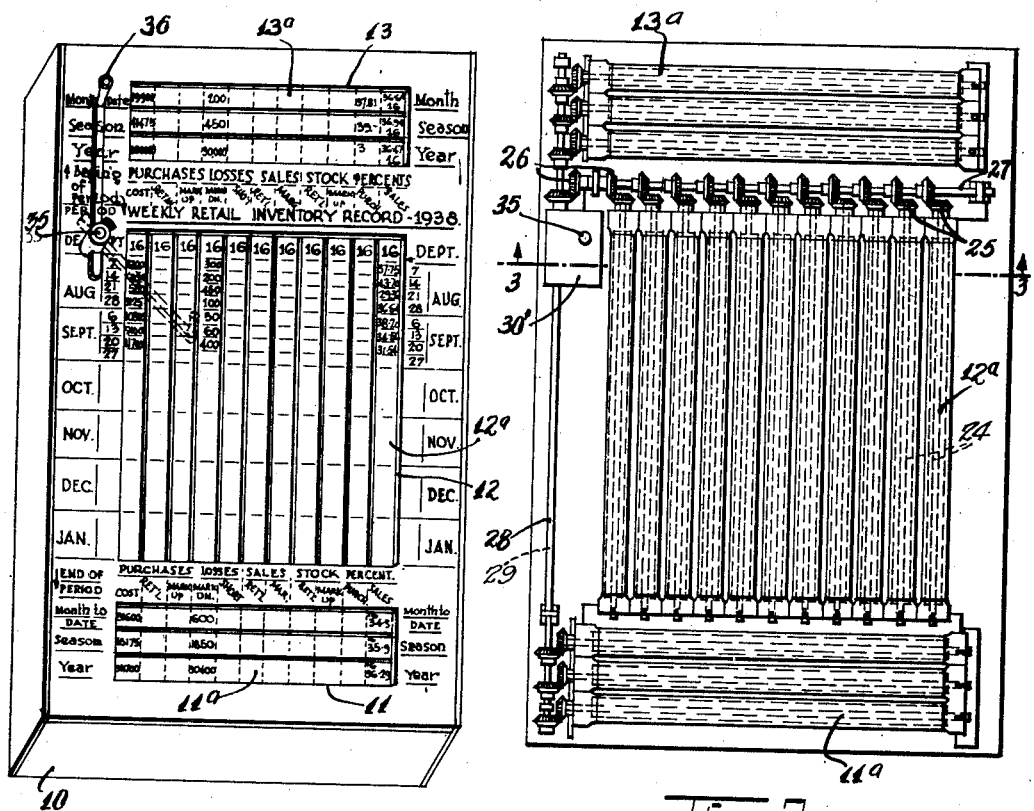
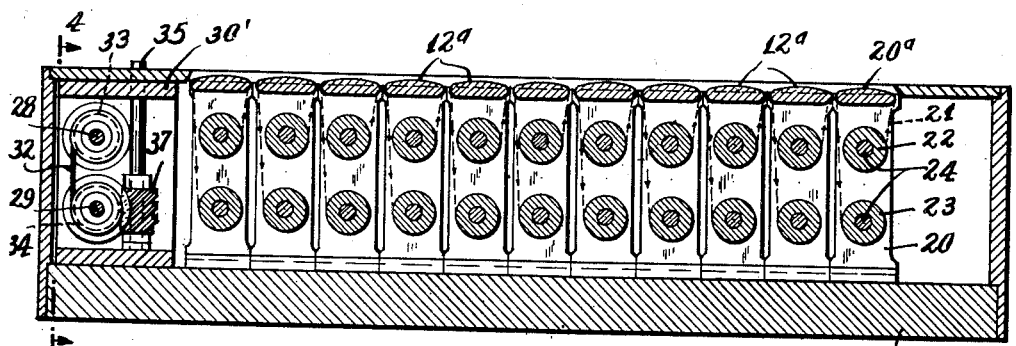
INVENTOR
CHESTER C. KASKELL
BY
ATTORNEY Oct. 10, 1939.   C. C. KASKELL   2,175,898
COUPLING FOR CONTINUOUSLY CHANGING SPEED TRANSMISSIONS
Original Filed Jan. 17, 1936    2 Sheets-Sheet 2
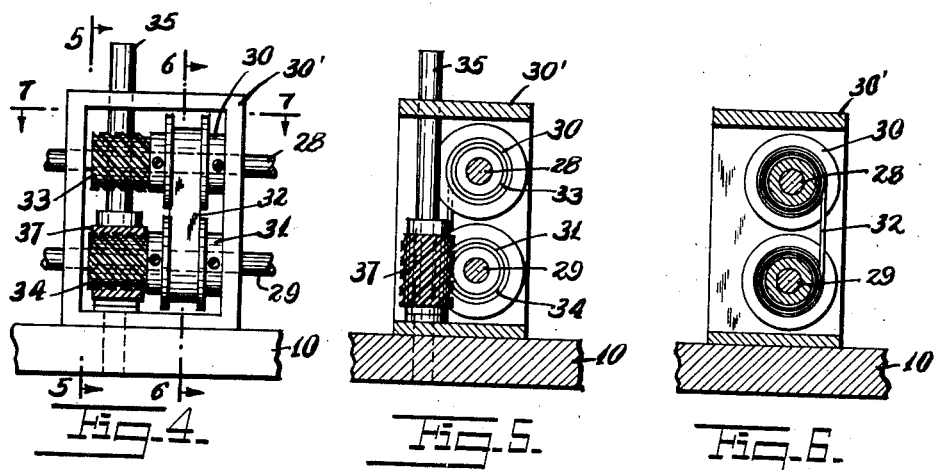
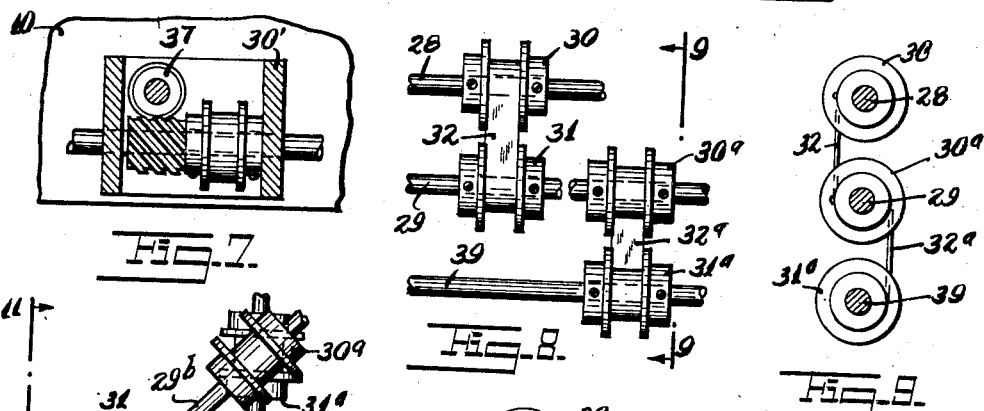
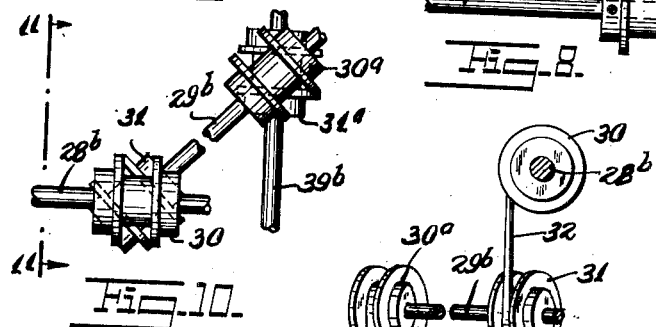
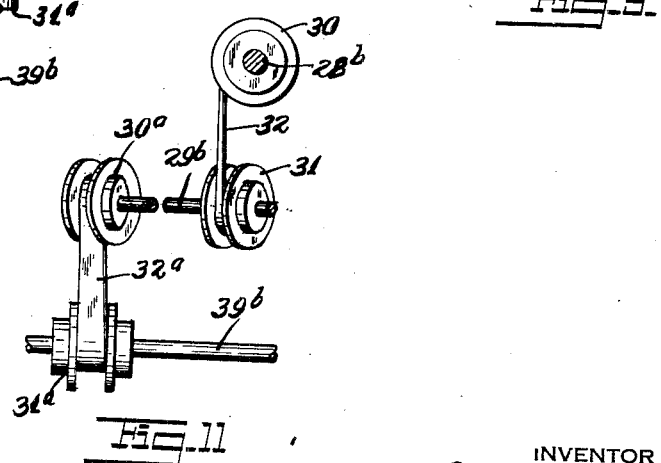
INVENTOR
CHESTER C. KASKELL
BY
ATTORNEY Patented Oct. 10, 1939

2,175,898

UNITED STATES PATENT OFFICE 2,175,898

COUPLING FOR CONTINUOUSLY CHANGING SPEED TRANSMISSIONS

Chester C. Kaskell, St. Paul, Minn.

Application January 17, 1936, Serial No. 59,576
Renewed March 1, 1939

4 Claims. (Cl. 242—55)

This invention relates to new and useful improvements in a progressive speed means and compensating winding device. This invention has numerous uses, one of which is disclosed in my co-pending application for a Composite recorder, Serial No. 683,738, now Patent No. 2,068,-272 of January 10, 1937.

The invention has for an object the construction of a device as mentioned which is characterized by drive tapes, webs, cords, or the like, connected at their ends to drive shafts and wound upon themselves in rolls upon said drive shafts; and auxiliary webs also connected at their ends and wound upon themselves in rolls upon said drive shafts or upon auxiliary shafts adapted to be rotated by said drive shafts, and means for rotating the common drive shafts so that their rotations are transmitted direct to the corresponding auxiliary shafts and through the drive tapes to the complementary drive shafts and to the auxiliary shafts connected therewith.

The invention also proposes the provision of means for rotating the drive rolls and auxiliary rolls so that all are rotatable and movable to and fro in synchronization.

It is a further object of this invention that the drive rolls and auxiliary rolls may be so adapted and synchronized so that the stress of transmitting rotations from one shaft to another be borne by the drive rolls and shafts and not by the auxiliary rolls and shafts.

Still further the invention contemplates constructions which permit the master shafts and auxiliary shafts to be at various angular positions to each other.

Furthermore, the invention proposes a construction whereby any number of master shafts and auxiliary shafts may be synchronized with each other.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan perspective view of a composite recorder as described in the co-pending application as previously mentioned, which is equipped with a progressive speed changing means according to this invention.

Fig. 2 is a plan view of Fig. 1 but illustrated with the outer casing removed.

Fig. 3 is a sectional enlarged view taken on the line 3—3 of Fig. 2.

Fig. 4 is a fragmentary elevational view looking in the direction of the line 4—4 of Fig. 3.

Fig. 5 is a sectional view taken on the line 5—5 of Fig. 4.

Fig. 6 is a sectional view taken on the line 6—6 of Fig. 4.

Fig. 7 is a horizontal sectional view taken on the line 7—7 of Fig. 4.

Fig. 8 is a fragmentary elevational view of a plurality of master shafts arranged according to a modification of the invention.

Fig. 9 is a sectional view taken on the line 9—9 of Fig. 8.

Fig. 10 is a plan view of master shafts connected according to another embodiment of the invention.

Fig. 11 is an end elevational view of Fig. 10, taken on the line 11—11 of Fig. 10.

The invention may best be understood by first understanding an application thereof, which may be examined in great detail in the co-pending application mentioned, or which may be readily understood from the following cursory description.

A composite recorder, to which the invention is applied, consists of an outer casing 10 formed with a plurality of openings 11, 12 and 13, through which a plurality of tape units 11$^a$, 12$^a$ and 13$^a$ are visible. These tape units disclose portions of tapes thereof which are adapted to move in synchronization so that at all times the same tape portions may be brought back into view when desired. The tape units are arranged transversely and longitudinally, or in other forms as necessary. The casing 10 is inscribed with data on the tape face thereof adjacent the openings through which the tapes are visible to facilitate a proper understanding of the data disclosed.

In Figs. 2 and 3 some of the details of the units have been disclosed so that the operations thereof may be better understood. Each of the tape units consists of a frame 20 having a transverse tape supported by a top portion 20$^a$ across which the web of a tape passes, as indicated by the dash lines 21 in Fig. 3. One end of the tape is wound upon an upper roller 22 rotative in the frame, and the other end of the tape upon a lower roller 23, also rotative in the frame. These rollers are fixed on shafts 24 which extend from the ends of the frame.

Bevel gears 25 are fixed on the extended ends of the shafts 24 and mash with other bevel gears 26 upon auxiliary drive shafts 27.

Drive shafts of the upper rollers 22 are connected with each other and with an upper master shaft 28. The drive shafts of the lower rollers 23 are also connected with each other and with a lower master shaft 29. These master shafts are superimposed and extend through a progressive speed changing means within a frame 30' which comprises the invention.

The master shafts 28 and 29 are connected with each other and synchronize with the tapes 21. This is accomplished by rollers 30 and 31 fixed respectively on the shafts 28 and 29 and connected by a tape 32. A spiral pinion 33 is fixed upon the shaft 28 and is located directly over a spiral pinion 34 fixed upon the shaft 29. A vertical shaft 35 is slidably mounted in the frame 30' and at the top end is equipped with a handle 36 by which it may be rotated. This handle is located outside the casing 10 (see Fig. 1). There is also a spiral gear 37 fixed upon the shaft 35 and adapted to mesh selectively with the gears 33 and 34, depending merely upon the position of the shaft 35.

In the lowered position of the shaft 35, the gears 34 and 37 engage each other. In the raised position, the gears 33 and 37 engage each other. The gears may be engaged with each other by merely moving the shaft upwards or downwards, and slowly rotating the shaft to cause engagement of the gears. Once the gears are engaged they will maintain their engagement frictionally, and rotations of the handle 36 will be properly transmitted to one or the other of the master shafts.

The rolls 30 and 31 and the gears 33 and 34 are arranged within the frame 30'. The tape 32 is synchronized with the tapes 21 by means of equal size rollers and gears so that regardless of the thickness of any of the tapes, all of the tapes will move in synchronization with each other whether they are wound on one of the rollers or on the other of the rollers. By increasing the diameter of the shafts by maintaining a uniform number of layers of tapes on both upper and lower shafts, sections of tape of various size width could be exposed.

All of the tapes have been first placed in relationship with each other according to the number of layers on the upper and lower rollers. Likewise the number of layers of tape upon the main shafts may be greater than that upon the auxiliary shafts provided the ratio is maintained: i. e.: the upper auxiliary shafts may have 60 layers and the lower ones 10. The number of layers on the master shafts may be 60 and 10 respectively or 120 and 20, or 90 and 15, etc. The master and auxiliary tapes would be in relationship with each other as long as the ratio of 6 to 1 was maintained. The extra length of the tape on the master shafts would have the effect of increasing their diameters so that the same result would be obtained as if both master and auxiliary shafts had tapes of the same length. In other words, one revolution of the upper master shaft, because of the uniform gearing, would cause one revolution of the upper auxiliary shafts and if the compounding revolution of the lower master shaft were 1½ times, the lower auxiliary shafts would also revolve at this rate.

In Fig. 8 and 9 another embodiment of the invention has been disclosed in which it is shown applied to three master shafts. There are the shafts 28 and 29 and a third shaft, indicated by reference numeral 39. The shafts 28 and 29 are connected with each other by the rolls 30 and 31 between which there is the tape 32. The master shafts 29 and 39 are connected with each other by rolls 30ª and 31ª mounted thereon and connected by tape 32ª. These rolls and tapes are synchronized with each other. Thus, the three master shafts are connected for progressive speed changes as required.

In Figures 10 and 11 another embodiment of the invention is shown in which there are three master shafts, but arranged at angles to each other. There is a top master shaft 28ᵇ which is at a right angle to the bottom master shaft 39ᵇ. There is a central master shaft 29ᵇ at 45° to the master shafts 28ᵇ and 39ᵇ. These master shafts are connected with each other by rolls and tapes as described relative to Figs. 8 and 9. These parts may be recognized by the identical reference numerals. The tapes 32 and 32ª are of material which is capable of flexing so that they may be turned through the required angles when passing from certain of the rolls to others of the rolls.

The operation of the device is as follows:—The rolls and tapes which connect the master shafts are synchronized with the rolls and tapes on some device adapted to be operated in synchronization. Then, irrespective of the positions of the rollers and tapes on the auxiliary shafts, they will always be moved at the same speeds and relation with each other, by the proper operation of the master shafts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A progressive speed changing means, comprising a master shaft, auxiliary shafts connected with said master shaft, a second master shaft, a second group of auxiliary shafts connected with said second master shaft, webs, each web having one of its ends wound on one of said auxiliary shafts and having its other end wound on one of said second group of auxiliary shafts, a tape having its one end wound on said master shaft and having its other end wound on said second master shaft and synchronized with said webs and rolled portions thereof, and means for selectively rotating said master shafts, said master shafts being at angles to each other and said tape being flexible so as to be capable of twisting when winding from one of the shafts to the other.

2. A progressive speed changing means, comprising a plurality of master shafts, auxiliary shafts connected with said shafts, webs wound and mounted on said auxiliary shafts, and a tape wound at its ends upon said master shafts and synchronized with said webs and rolled portion thereof, said master shafts being adapted to be selectively rotated, said master shafts being at angles to each other.

3. A progressive speed changing means, comprising a master shaft, auxiliary shafts connected with said master shaft so as to rotate therewith when said master shaft is turned, a second master shaft, a second group of auxiliary shafts connected with said second master shaft so as to rotate therewith when said second master shaft is turned, webs each having one of their ends wound on one of said auxiliary shafts and having the other of their ends wound on one of said second group of auxiliary shafts, a tape having its one end wound on said master shaft and having its other end wound on said second master shaft and synchronized with said webs and rolled portions thereof, and means for selectively rotating said master shafts to move said webs through a pre-determined distance with relation to said tape.

4. A progressive speed changing means, comprising a master shaft, auxiliary shafts connected with said master shaft so as to rotate therewith when said master shaft is turned, a second master shaft, a second group of auxiliary shafts connected with said second master shaft so as to rotate therewith when said second master shaft is turned, webs each having one of their ends wound on one of said auxiliary shafts and having the other of their ends wound on one of said second group of auxiliary shafts, a tape having its one end wound on said master shaft and having its other end wound on said second master shaft and synchronized with said webs and rolled portions thereof, and means for selectively rotating said master shafts to move said webs through a pre-determined distance with relation to said tape, comprising spiral gears mounted upon the master shafts which run parallel to each other and are superimposed, a slidable shaft at right angles to said master shafts and being adapted to maintain its position frictionally, and a spiral gear mounted on said slidable shaft and selectively engageable with said spiral gears to selectively rotate said master shafts which in turn selectively rotate said auxiliary shafts.

CHESTER C. KASKELL.